US012627503B1

(12) United States Patent
Snyder

(10) Patent No.: US 12,627,503 B1
(45) Date of Patent: May 12, 2026

(54) DISTRIBUTED MULTIPOINT AND MULTI-SPHERE ENTROPY-BASED NETWORK SECURITY

(71) Applicant: Todd E. Snyder, Nashville, TN (US)

(72) Inventor: Todd E. Snyder, Nashville, TN (US)

( * ) Notice: Subject to any disclaimer, the term of this patent is extended or adjusted under 35 U.S.C. 154(b) by 0 days.

(21) Appl. No.: 19/429,938

(22) Filed: Dec. 22, 2025

(51) Int. Cl.
*H04L 9/32* (2006.01)
*H04L 9/08* (2006.01)

(52) U.S. Cl.
CPC .......... *H04L 9/3242* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 7,697,420 | B1 | 4/2010 | Garahi | |
| 9,507,566 | B2 | 11/2016 | Payne | |
| 10,402,172 | B1 * | 9/2019 | Mandich | H04L 9/0858 |
| 11,412,383 | B2 | 8/2022 | Haleem | |
| 11,438,315 | B1 * | 9/2022 | Liu | H04L 9/0841 |
| 12,045,583 | B2 * | 7/2024 | Mandich | H04L 9/0662 |
| 12,052,350 | B2 | 7/2024 | MM | |
| 2008/0256151 | A1 * | 10/2008 | Acar | G06F 7/58 708/250 |
| 2017/0168776 | A1 * | 6/2017 | Boenisch | H04L 9/3247 |
| 2018/0300108 | A1 * | 10/2018 | Goldman | H04L 67/10 |
| 2021/0167953 | A1 * | 6/2021 | Islam | H04L 9/3242 |
| 2021/0409207 | A1 * | 12/2021 | Prokop | G06F 7/582 |
| 2025/0138785 | A1 * | 5/2025 | Abellán Sánchez | G06F 7/588 |

OTHER PUBLICATIONS

Zhang J, Wu M. Random number generation based on heterogeneous entropy sources fusion in multi-sensor networks. Sensors. Oct. 16, 2023;23(20):8497. (Year: 2023).*
Ghosal A, Halder S, Chessa S. Secure key design approaches using entropy harvesting in wireless sensor network: A survey. Journal of Network and Computer Applications. Jan. 15, 2017;78:216-30. (Year: 2017).*
Carlton Shepherd, Entropy Collapse in Mobile Sensors: The Hidden Risks of Sensor-Based Security (ArXiv, Oct. 2025). School of Computing, Newcastle University, Newcastle-upon-Tyne, UK.
Binghui Wu, RECTor: Robust and Efficient Correlation Attack on Tor (ArXiv, Nov. 2025). Electrical and Computer Engineering, National University of Singapore.
Sarah Scoles, GPS Is Vulnerable: New Technology May Be Required (Undark Magazine/MDP), Dec. 2025).

* cited by examiner

*Primary Examiner* — James R Turchen

(57) ABSTRACT

A system and method for generating cryptographic keys to secure wide-area network (WAN) traffic utilizing real-time, high-entropy data derived from a distributed physical layer. The system utilizes a hybrid multi-point architecture comprising: (1) a plurality of Mobile Nodes configured to harvest stochastic multi-sphere telemetry data (e.g., environmental, biological, galactic, and technological noise); (2) a plurality of Anchor Nodes configured to harvest stochastic data, validate Mobile Node location proofs via Time-Difference-of-Arrival (TDoA) analysis, and stabilize network topology; and (3) a Universal Entropy Engine configured to generate a global security hash (GSH). This GSH enables the derivation of ephemeral encryption keys for native decentralized networks and third-party overlays (e.g., SD-WAN, IoT). By coupling security to the vast, non-deterministic multi-sphere, the system defends against quantum and algorithmic threats.

5 Claims, 8 Drawing Sheets

FIG. 2

DISTRIBUTED MULTIPOINT AND MULTI-SPHERE ENTROPY-BASED NETWORK SECURITY

BACKGROUND OF THE INVENTION

Field of the Invention: The present invention relates generally to the fields of cryptographic key generation, decentralized network architecture, networking, network security, computing, and mobile computing. Specifically, it focuses on a system and method(s) to dynamically generate "True Randomness" (TRNG) from multiple distributed multi-sphere sensor and/or telemetry data points. The invention utilizes a hybrid, distributed network of mobile and/or stationary nodes operating within terrestrial and non-terrestrial environments for real-time, anonymized entropy data harvesting, to secure various native network and third-party overlays (e.g., SD-WAN, IoT) against advanced data transmission threats.

Description of Related Art: Current network security protocols (TLS/SSL, VPNs) rely heavily on Pseudo-Random Number Generators (PRNGs) for encrypted session key generation. PRNGs are mathematical algorithms that, while statistically random, are fundamentally deterministic. For existing TRNG solutions that create keys from unpredictable physical processes, they are limited among other things by the quantity, diversity, and location of data sources, with their data only being harvested locally using very specialized hardware and silicon circuits. This invention fills a need for a security system and protocol that utilizes vast, wildly non-deterministic, distributed data point sources, and their hyper-unique mix of real-time data, to broadly capture "living chaos" and "energetic variables" from the earth's multi-sphere (e.g. geosphere, biosphere, atmosphere, hydrosphere, techno-sphere, and observable universe) as a root of trust, decoupled from the underlying transport layer to secure digital infrastructure against next-generation threats.

BRIEF SUMMARY OF THE INVENTION

The present invention, as a system and method(s), addresses the limitations of conventional cryptographic systems by introducing a Dynamic Multi-sphere Encryption and Routing Protocol (DMERP). Unlike traditional systems that generate security via mathematical algorithms (PRNGs), or localized hardware noise (TRNGs), this system utilizes a hybrid multi-point entropy architecture to harness the stochastic nature of earth's multi-sphere (e.g. geosphere, biosphere, atmosphere, hydrosphere, techno-sphere, and observable universe)—the aggregate, stochastic interaction of biological and nonbiological entities, environmental, ecological, and technological systems, physical, non-physical, and technological environments, and their interactive galactic space—to serve as a distributed, non-deterministic root of trust for digital security.

In one aspect, the invention provides a method for generating security via a "Universal Entropy Engine" (UEE) that is independent of the underlying data transport layer. Crucially, the system utilizes a "Zero-Transmission" Key Architecture. Instead of transmitting private keys, the UEE broadcasts a public Global Security Hash (GSH) derived from multi-sphere telemetry. This GSH serves as a non-deterministic seed, allowing distributed nodes to execute a Local Key Generation Function (KGF) to derive ephemeral session keys independently at the edge. Furthermore, the system utilizes the GSH to drive an "Entropy Ratchet," continuously evolving the internal secrets of each node to ensure Perfect Forward Secrecy. By decoupling the generation of entropy from the exchange of keys, the system eliminates Man-in-the-Middle vulnerabilities.

In another aspect, the invention provides a Network-Agnostic Overlay. This "Security-as-a-Service" model allows the generated multi-sphere entropy to secure any digital transmission, including third-party networks (e.g., Corporate SD-WAN, VPNs, IoT) against algorithmic and quantum threats, regardless of whether the data travels over the native network, the public internet, or any private communications network infrastructure.

In yet another aspect, the invention utilizes the Global Security Hash to seed a Dynamic Routing Protocol (DRP). This protocol randomizes data packet paths across the mesh based on real-time multi-sphere fluctuations, creating a "moving target" network topology that resists traffic analysis.

To achieve this, the invention comprises a Hybrid Multi-Point Architecture designed to maximize both entropy diversity and network resilience through a broad spectrum of computing apparatuses:

1. Mobile Nodes (Entropy Harvesters): Unlike systems limited to standard consumer electronics, the present invention explicitly incorporates a diverse range and mix of user-owned, proprietary, manned, remote controlled, and autonomous computing apparatuses. These include, but are not limited to:

Consumer Devices: Smartphones, tablets, laptops, PCs, peripherals, and wearables utilized for passive background entropy harvesting.

Proprietary Hardware: Custom-built handheld and/or wearable transceivers and devices optimized for high-sensitivity multi-sphere telemetry and entropy harvesting.

Manned, Remotely Operated, and Autonomous Mobility and Robotic Platforms: Ground vehicles, aerial vehicles, water vehicles, service robots, and logistics robots for multi-sphere telemetry and entropy harvesting.

Anthropomorphic and Biometric Agents: Humanoid robots and/or advanced prosthetic interfaces capable of generating unique entropy streams for harvest.

2. High-Capacity Anchor Nodes (Entropy Harvesting, Validation, and Redundancy): In addition to entropy harvesting, these robust infrastructure units serve as the "Trust Anchors" of the system, comprising capabilities such as Time-Difference-of-Arrival (TDoA) analysis and onboard consensus logic and analytics to validate the physical reality of Mobile Nodes ("Proof of Space-time"). The invention provides for dynamic form factors, including:

Stationary Configurations: Fixed infrastructure deployments (e.g., rooftop pylons, wall-mounted units, street furniture/fixtures, or indoor gateways) utilizing redundant wired (Fiber/Ethernet) and/or wireless (Satellite/5G) backhaul to ensure network stability.

Mobile Platform Configurations: Anchor Nodes integrated with/into vehicles, public transit, maritime vessels, drones, satellites, robots, gear packs, or aircraft to provide a moving "Bubble of Trust" for mobile fleets/groups, etc.

By synthesizing these elements, the invention creates a self-healing, bio-mimetic security fabric. The system translates the physical unpredictability of the living, active world into mathematical security, providing a dynamic defense against algorithmic decryption and quantum computing threats superior to static, silicon-based random number generators.

BRIEF DESCRIPTION OF DRAWINGS

Figure 2:
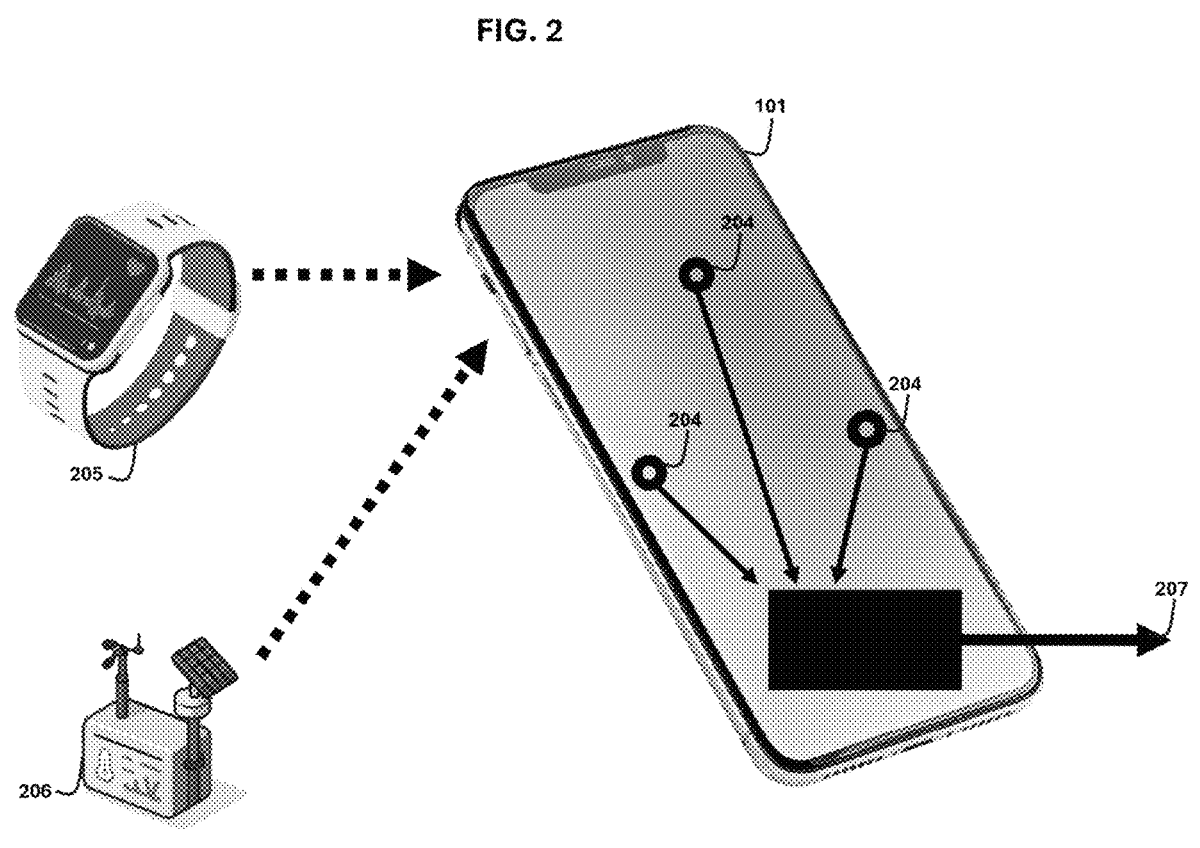

FIG. 2, "The Mobile Node-Sensor Fusion," showcases the harvesting of entropy from onboard sensors {204} and "nearby accessible" telemetry sources (e.g., wearables {205}/peripherals {206}) to generate an anonymized entropy digest {207}.

DETAILED DESCRIPTION OF THE INVENTION

1. System Overview

Figure 1:
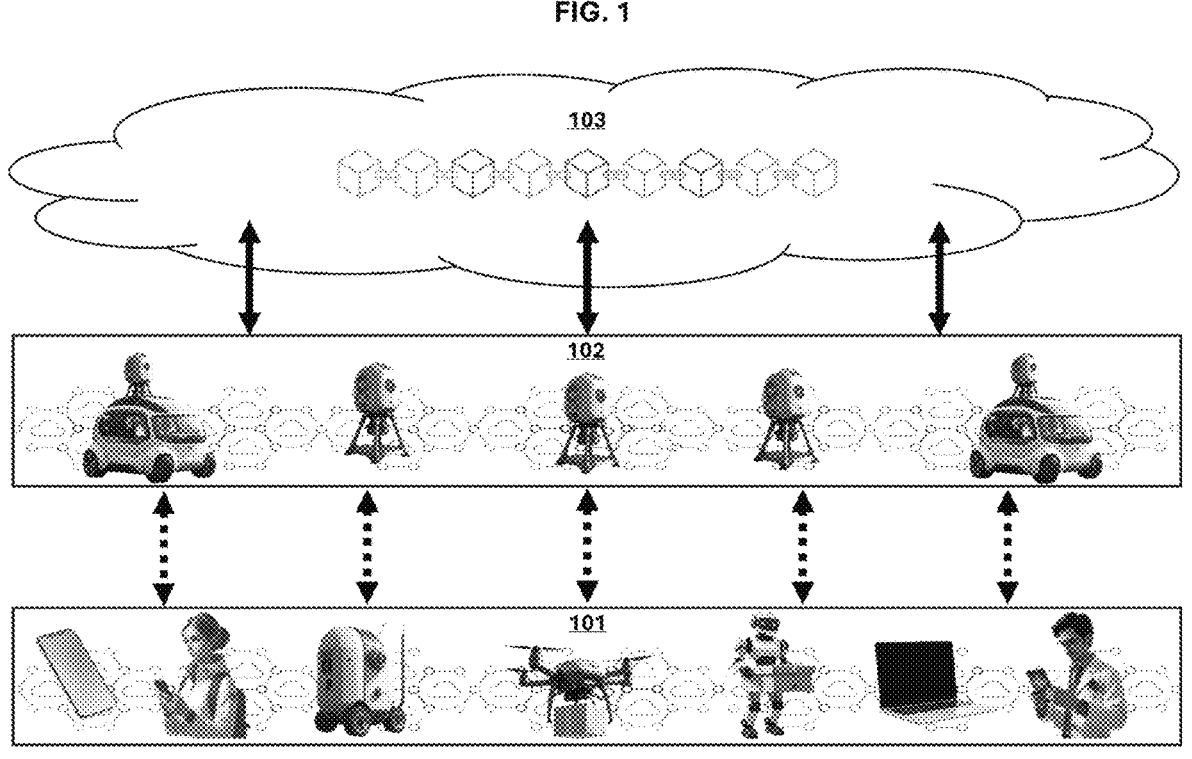
FIG. 1 is a high-level network layer diagram illustrating "The Hybrid Topology Ecosystem," showing the interaction between Mobile Nodes (users, robots) {101}, Anchor Nodes (fixed, mobile) {102}, and the Universal Entropy Engine {103}.
Figure 3:
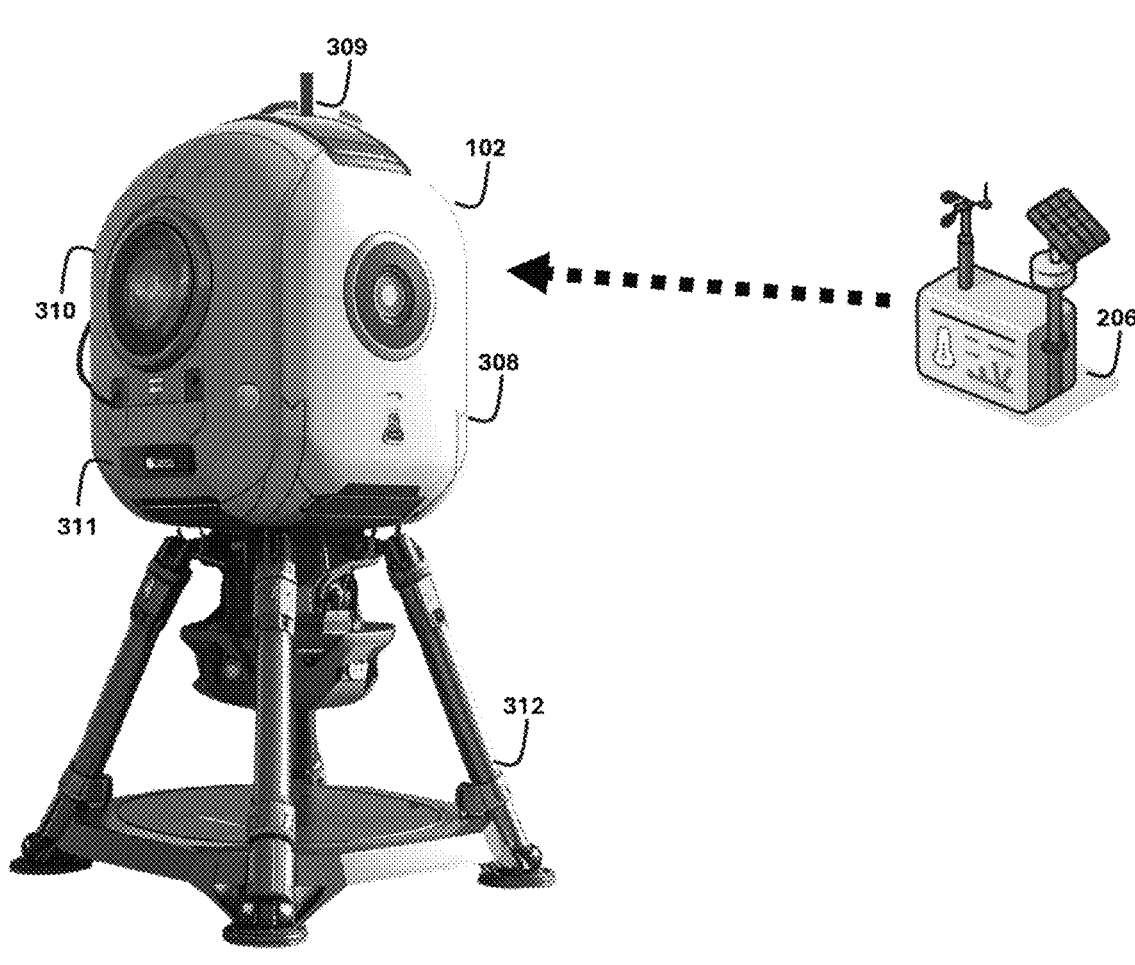
FIG. 3 is an illustrated example of an "Anchor Node {102}," featuring its basic components, such as an internal sensor suite {308}, periphery sensors {206}, multi-band antennae array {309}, optical validation sensors {310}, dual-mode platform (Fixed/Mobile) capacity {311}, and redundant backhaul capacity {312}.
Figure 4:
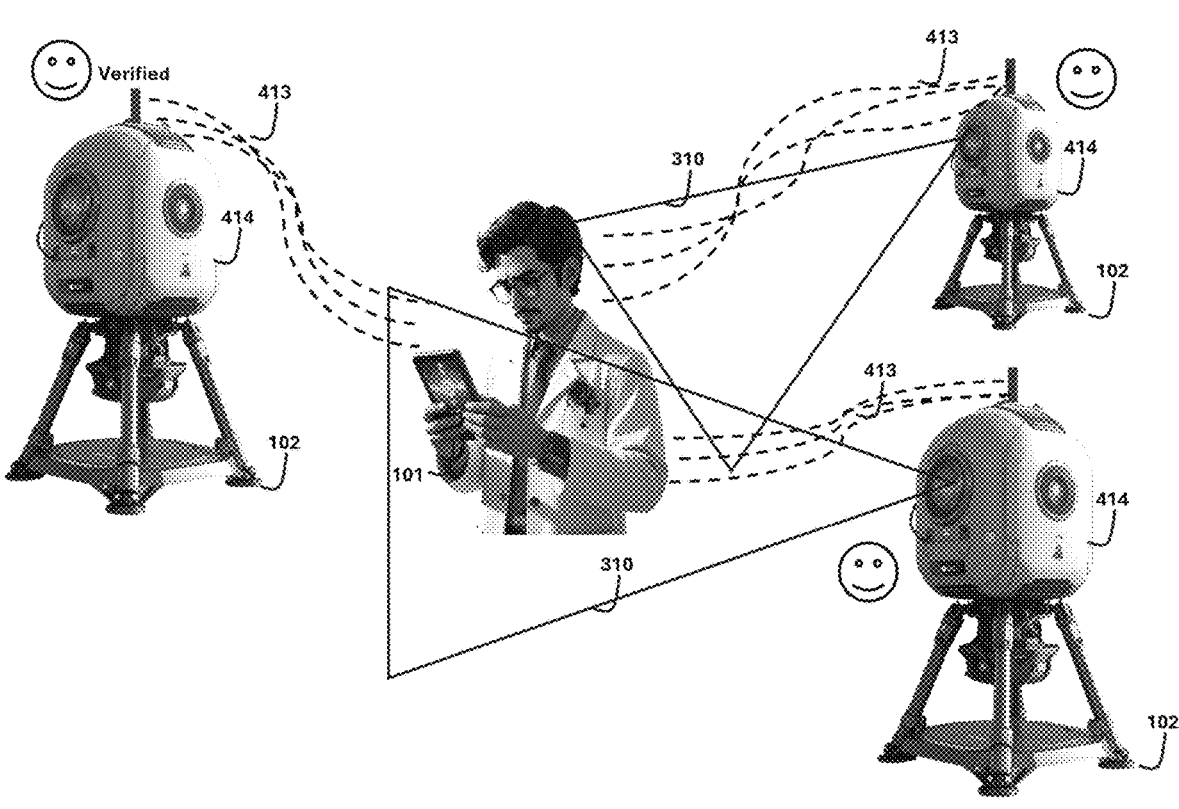
FIG. 4 illustrates "Validation (Proof of Spacetime)," depicting Anchor Nodes' {102} completing TDoA signal analysis {413}, combined with optical validation sensors {310}, and onboard consensus logic and analytics {414}, to verify Mobile Node {101} presence.
Figure 5:
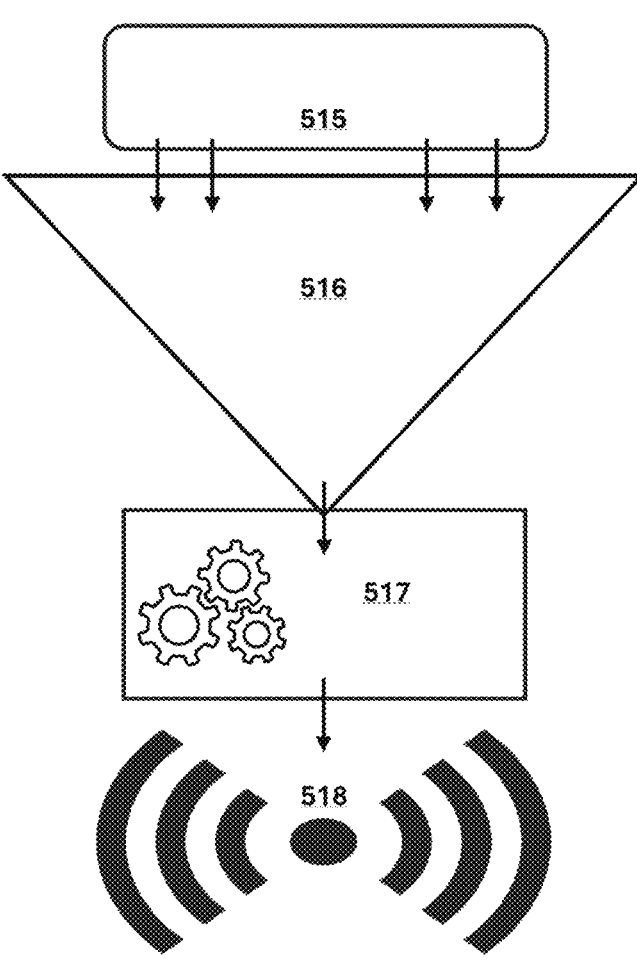
FIG. 5 is a process flowchart for "The Universal Entropy Engine (GSH Flow)," showing the input from nodes {515} flowing to entropy aggregation {516}, to whitening and hashing {517}, to Global Security Hash (GSH) broadcast {518}.
Figure 6:
FIG. 6 is a basic example diagram of "The Network-Agnostic Security Overlay," showing the invention encapsulating enterprise WAN {619} traffic, in this example between a bank and a bank branch, by way of GSH injection to the enterprise from the Universal Entropy Engine {103} and its GSH broadcast {518}.
Figure 7:
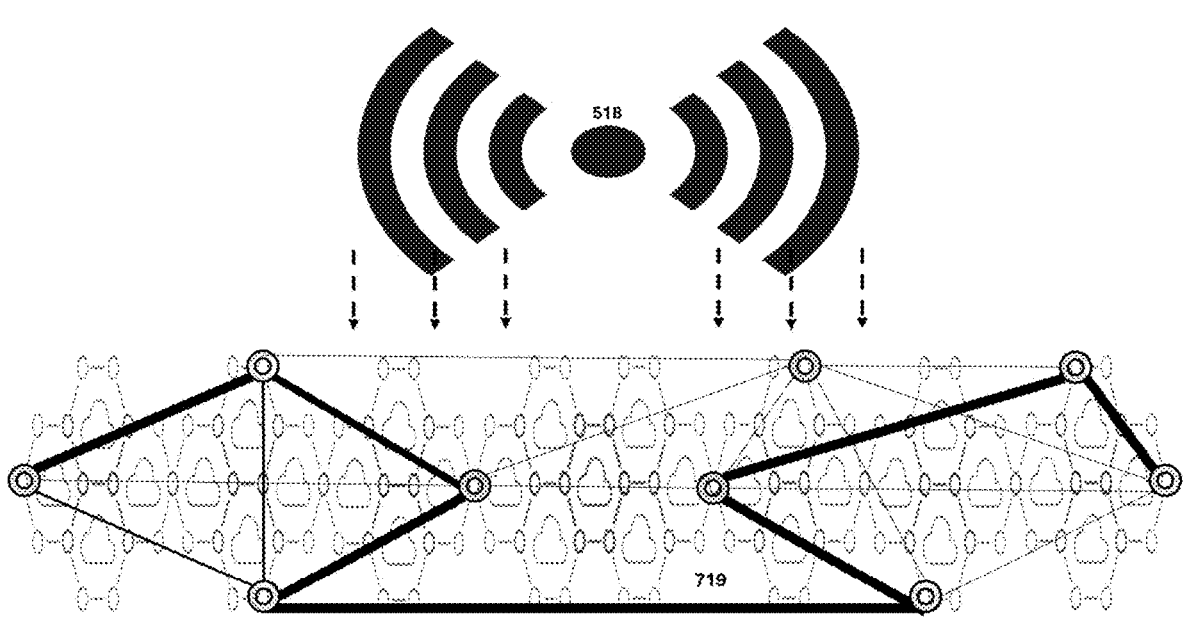
FIG. 7 illustrates the basics of the "Dynamic Routing Protocol (DRP)," showing the GSH broadcast {518} seeding polymorphic routing paths through a mesh network {719}.
Figure 8:
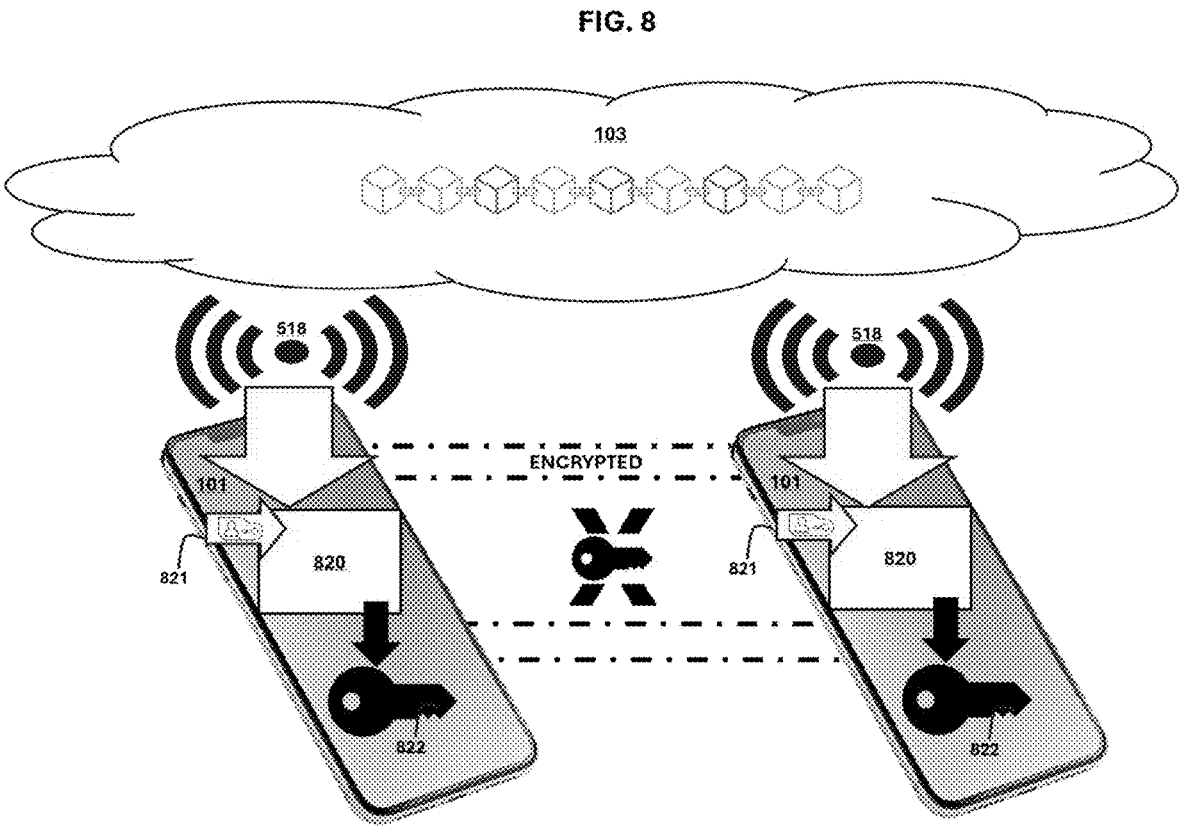
FIG. 8 illustrates the basics of "Dual-sided Local Derivation," showing a "Zero-Transmission" architecture whereby keys are derived locally on Mobile Nodes {101} for encryption of data between Mobile Nodes {101} by combining GSH broadcast {518} with Local KDF {820} and private credentials {821} to establish viable session keys {822} without ever directly exchanging session keys.

The present invention, as a system and method(s), addresses the limitations of conventional cryptographic systems by introducing a Dynamic Multi-sphere Encryption and Routing Protocol (DMERP). Unlike traditional systems that generate security via mathematical algorithms (PRNGs), or localized hardware noise (TRNGs), this system utilizes a hybrid multi-point entropy architecture to harness the stochastic nature of earth's multi-sphere (e.g. geosphere, biosphere, atmosphere, hydrosphere, techno-sphere, and observable universe)—the aggregate, stochastic interaction of biological and nonbiological entities, environmental, ecological, and technological systems, physical, non-physical, and technological environments, and their interactive galactic space—to serve as a distributed, non-deterministic root of trust for digital security.

The system operates on a "Separation of Concerns" (SoC) principle utilizing a "Zero-Transmission" Key Architecture:

The Security Layer (The Universal Entropy Engine): Generates a public Global Security Hash (GSH) derived from multi-sphere telemetry, serving as a synchronized entropy beacon.

The Transport Layer (The Hybrid Mesh): Routes data packets securely via optimized paths utilizing a Dynamic Routing Protocol (DRP).

Crucially, the Security Layer can function independently, providing entropy to third-party networks (e.g., SD-WAN, IoT) that do not utilize the Transport Layer. By broadcasting a public hash rather than private keys, the system eliminates the risk of Man-in-the-Middle (MitM) interception.

2. The Mobile Node (Entropy Harvesting Apparatus)

The Mobile Node acts as the primary "Entropy Harvester" and edge-computing unit. While in some embodiments this node may be instantiated as a software application on a third-party consumer device (e.g., smartphone, tablet, smartwatch), in the preferred embodiment, the Mobile Node encompasses a broad class of user-owned, proprietary, manned, remote controlled, and autonomous computing apparatuses. And the invention explicitly anticipates the use of dedicated, proprietary hardware configured specifically for optimal entropy harvesting. These proprietary form factors include, but are not limited to:

Dedicated Handheld and Wearable Units: Custom-built transceivers and devices optimized for high-sensitivity multi-sphere telemetry.

Autonomous Mobility and Robotic Platforms: Unmanned Ground Vehicles (UGVs), Unmanned Aerial Vehicles (UAVs/Drones), Unmanned Water Vehicles (UWVs), satellites, and autonomous service and logistics robots.

Anthropomorphic and Biometric Agents: Humanoid robotics and advanced prosthetic interfaces capable of generating entropy through complex, articulated movement.

Telemetry Aggregation: Regardless of form factor, a Mobile Node harvests a multi-dimensional array of stochastic data points, including but not limited to:

Kinetic and Articulated Data: Accelerometer variance, gyroscopic rotation, and servo-motor feedback (in robotic embodiments).

Biological and Biometric Data: User heart rate variability (HRV), galvanic skin response, or step cadence (when authorized).

Ecological Data: Barometric pressure, ambient light/lidar depth maps, and local electromagnetic noise.

Privacy-First Processing: To ensure privacy and operational security, raw telemetry is processed via a "Whitening Filter" and cryptographic hash function (e.g., SHA-3) to produce an anonymized "Entropy Digest."

3. The High-Capacity Anchor Node (Entropy Harvesting, Validation and Redundancy)

In addition to entropy harvesting like the Mobile Nodes, these robust infrastructure units serve as the "Trust Anchors" of the system, comprising capabilities such as Time-Difference-of-Arrival (TDoA) analysis and onboard consensus logic and analytics to validate the physical reality of Mobile Nodes ("Proof of Spacetime"). Without Anchor Node and/or network validation, Mobile Node entropy digests are not used. The invention provides for dynamic form factors, including but not limited to:

Stationary Configurations: Fixed infrastructure deployments (e.g., rooftop pylons, towers, wall-mounted units, street furniture/fixtures, or indoor gateways) utilizing redundant wired (Fiber/Ethernet) and/or wireless (Satellite/5G) backhaul to ensure network resilience.

Mobile Platform Configurations: Anchor Nodes integrated with/into vehicles, public transit, maritime vessels, drones, satellites, robots, gear packs, or aircraft to provide a moving "Bubble of Trust" for mobile fleets/groups, etc.

4. The Universal Entropy Engine (UEE) & Global Security Hash (GSH)

The UEE is the central logic core that ingests validated Entropy Digests.

Entropy Mixing: The UEE combines digests from a multitude of diverse sources (e.g., a heartbeat in Tokyo, a footstep in New York, a wind gust in London) into a Global Entropy Pool.

The Global Security Hash (GSH): Instead of generating final private keys, the UEE broadcasts a time-variant Global Security Hash (GSH) to all authenticated nodes. This GSH represents the current "state of the multi-sphere" and serves as a public, non-deterministic seed for local operations.

5. Localized Key Generation Function (KGF) and Entropy Ratchet

The invention utilizes a distributed key derivation method to ensure Perfect Forward Secrecy (PFS) and Continuous Self-Healing.

Local Execution: Upon receiving the GSH, each Node (Mobile or Anchor) executes a Local Key Generation Function (KGF).

The Calculation: The Node combines the public GSH with its own private credentials. The KGF mathematically derives a one-time Ephemeral Session Key.

The Entropy Ratchet (Continuous Forward Secrecy): To prevent static key vulnerability, the system employs an "Entropy Ratchet." Upon the reception of each new GSH broadcast, the Node utilizes the GSH not only to generate a session key but also to mathematically "evolve" its own internal root secret (e.g., New_Root=Hash (Old_Root+GSH)). This ensures that even if a device is physically compromised at Time T, the attacker cannot mathematically reverse the function to decrypt communications from Time T−1.

Zero-Transmission: Because the final key is generated and the root secret is evolved independently on the device, neither the key nor the secret ever travels over the network.

6. Dynamic Routing Protocol (DRP)

The Transport Layer utilizes the same GSH to secure the routing topology.

GSH-Seeded Routing: The Dynamic Routing Protocol (DRP) uses the current GSH as a randomization seed to calculate the routing path for data packets.

Polymorphic Paths: Because the GSH changes dynamically based on multi-sphere fluctuations, the optimal routing path for a data packet changes constantly. A packet sent at T=0 may take Path A, while a packet sent at T=1 may take Path B. This prevents traffic analysis and DDoS attacks, as the network topology acts as a "moving target" randomized by the multi-sphere.

7. The Network-Agnostic Overlay (the Utility Model)

The invention enables a "Security-as-a-Service" model. Decoupled Operation: A third-party network (e.g., a Bank's SD-WAN) can subscribe to the UEE. The Bank's routers receive the UEE Global Security Hash (GSH) broadcast and use it to derive local keys.

The Benefit: The Bank's traffic continues to flow over its own private lines (Cisco/Juniper hardware), but the encryption protecting that traffic is powered by the unhackable physics of the UEE network. This allows legacy infrastructure to become quantum-resistant without replacing hardware.

The invention claimed is:

1. A method for generating ephemeral encryption keys and/or a global security hash (GSH) from a distributed physical layer, comprising:

collecting stochastic multi-sphere telemetry data from earth's multi-sphere and observable universe from a plurality of distributed mobile and/or stationary computing apparatuses, wherein said stochastic multi-sphere telemetry data includes at least one or more data types selected from a group including motion data, biological biometric data, ecological environmental data, galactic space data, and technological multi-sphere data including electromagnetic spectrum noise;

normalizing said stochastic multi-sphere telemetry data into a set of anonymized entropy digests via a normalization process including a whitening filter and/or cryptographic hash function;

validating a physical origin and an integrity of said anonymized entropy digests via Time-Difference-of-Arrival (TDoA) signal analysis and a consensus of signal latency measurements and/or alternative physical/presence integrity verification protocols and analytics available across a network;

aggregating said validated anonymized entropy digests to form a dynamic global entropy pool; and generating the global security hash and/or ephemeral encryption keys from said dynamic global entropy pool to secure digital data transmission against algorithmic and quantum decryption threats.

2. The method of claim 1, further comprising utilizing an "Entropy Ratchet" protocol, wherein one or more stored private credentials of the distributed mobile and/or stationary computing apparatuses are mathematically updated and evolved in real-time by ingesting the Global Security Hash (GSH), thereby ensuring Continuous Forward Secrecy (CFS) where a compromised credential cannot be utilized to decrypt prior communications.

3. The method of claim 1, wherein the validating step ("Proof of Spacetime") comprises:

correlating a set of reported geospatial coordinates/presence of a selected mobile node with at least one independent physical verification vector; and said independent physical verification vector being derived from one or more of Time-Difference-of-Arrival (TDoA) signal analysis, optical analysis of local environment features (via camera and/or LiDAR), cross-referencing of onboard and/or nearby sensor data, movement analytics, and/or network and node analytics; and rejecting the entropy digests if deviation between the reported geospatial coordinates/presence data and the independent physical verification vector exceeds a predetermined threshold.

4. The method of claim 1, wherein the "biological biometric data" comprises time-variant physiological signals, including one or more of heart rate variability (HRV), galvanic skin response, or gait cadence, harvested from authorized users to serve as a unique, non-replicable entropy source.

5. The method of claim 1, further comprising a "Zero-Transmission" Key Exchange protocol, wherein:

a first computing apparatus and a second computing apparatus independently generate an identical ephemeral session key by utilizing the current Global Security 5 Hash (GSH) as a deterministic input parameter alongside a pre-shared private credential within a local Key Derivation Function (KDF); and said identical ephemeral session key is established between the first and second computing apparatuses 10 without ever transmitting said identical ephemeral session key across the network.

\* \* \* \* \*